United States Patent
Sakamoto et al.

[11] Patent Number: 5,610,465
[45] Date of Patent: Mar. 11, 1997

[54] HIGH-FREQUENCY MOTOR

[75] Inventors: Shinichi Sakamoto, Hitachi; Masanori Kobayashi, Ibaraki-ken, both of Japan

[73] Assignee: Hitachi Koki Company Limited, Tokyo, Japan

[21] Appl. No.: 443,162

[22] Filed: May 17, 1995

[30] Foreign Application Priority Data

Jun. 24, 1994 [JP] Japan .................... 6-143084

[51] Int. Cl.$^6$ .................................. H02K 17/16
[52] U.S. Cl. ............................ 310/211; 310/125
[58] Field of Search ...................... 310/211, 42, 125

[56] References Cited

U.S. PATENT DOCUMENTS

| | | | |
|---|---|---|---|
| 3,629,632 | 12/1971 | Loupe | 310/74 |
| 3,965,380 | 6/1976 | Stepina | 310/77 |
| 4,393,344 | 7/1983 | Whellams | 318/759 |
| 4,577,128 | 3/1986 | Gould et al. | 310/87 |
| 4,713,567 | 12/1987 | Fey et al. | 310/105 |
| 4,720,647 | 1/1988 | Plumer | 310/77 |
| 4,885,494 | 12/1989 | Higashi | 310/211 |
| 4,910,423 | 3/1990 | Werber | 310/77 |

*Primary Examiner*—Thomas M. Dougherty
*Assistant Examiner*—Michael Wallace, Jr.
*Attorney, Agent, or Firm*—Pollock, Vande Sande & Priddy

[57] ABSTRACT

A high-frequency motor comprises a squirrel-cage rotor. The rotor comprises an iron core having a plurality of circular slots, a plurality of conductive rods inserted into the slots, and short-circuit rings disposed at both ends of the conductive rods. The conductive rods are made of copper. A ratio of a product of the number N2 of the conductive rods and a diameter d2 of each conductive rod to an outer diameter D of the rotor is in an optimized range of 1.1 to 1.5, namely, $1.1 \leq N2 \cdot d2/D \leq 1.5$. With this optimization, it becomes possible to achieve a maximum rotational speed of more than 120,000 min$^{-1}$ and obtain an excellent motor efficiency.

6 Claims, 2 Drawing Sheets

HIGH-FREQUENCY MOTOR

BACKGROUND OF THE INVENTION

1. Field of the Invention

This invention relates to a high-frequency motor having a maximum rotational speed of not less than 120,000 $\text{min}^{-1}$.

2. Prior Art

When a squirrel-cage rotor is driven at higher speeds, it generally encounters a problem that its operational limitation is determined by a circumferential stress acting on an iron core. To solve this problem, conventionally available high-frequency motors have employed aluminum for conductive rods instead of copper because the density of aluminum is smaller than that of copper, thereby reducing a circumferential stress acting on the iron core of the rotor. Thus, the high-frequency motor can be driven as intended at higher speeds up to more than 120,000 $\text{min}^{-1}$ without causing deformation or damage of the rotor.

Furthermore, there is another known conventional high-frequency motor which adopts an iron core of the rotor made of silicon steel plate having high strength or a steel plate used for various spring members. Moreover, it was possible to use a so-called solid rotor whose iron core is made of integral material instead of a laminated core.

The above-described maximum rotational speed of more than 120,000 $\text{min}^{-1}$ is a practical value for high-frequency motors used for specific purposes.

When each conductive rod is made of aluminum instead of copper, one of the problems encountered is an increase of electric resistance which induces secondary copper loss larger than that of a comparable copper conductive rod. Furthermore, when the iron core of the rotor is made of high strength silicon steel plate or spring steel plate, it will suffer an increase of iron loss, the amount of which is larger than that of the laminated core made of silicon steel plate conventionally used for various electrical machineries and devices, although the strength problem of the rotor can be solved. In short, usage of high strength materials will be possibly subjected to deterioration of magnetic and electric performance, resulting in serious reduction of motor efficiency.

At present, the design of high-frequency motors employing copper conductive rods to achieve a maximum rotational speed of more than 120,000 $\text{min}^{-1}$, there is no data optimizing both the strength and the motor performance.

SUMMARY OF THE INVENTION

Accordingly, in view of above-described problems encountered in the prior art, a principal object of the present invention is to provide a high-frequency motor having a squirrel-cage rotor with a set of conductive rods made of copper having a small electric resistance and a rotor which are both optimized in size and number. More specifically, assuming that the total number of the conductive rods is N2, the diameter of each conductive rod is d2, and the outer diameter of the rotor is D, the design of the squirrel-cage rotor is carried out based on optimization such that the ratio of N2·d2/D is somewhere in an appropriate range. With such an optimization of size and number on the design, it becomes possible to achieve a maximum rotational speed of more than 120,000 $\text{min}^{-1}$ without decreasing motor performance.

In order to accomplish this and other related objects, the present invention provides a high-frequency motor comprising a squirrel-cage rotor, the rotor comprising: an iron core having a plurality of circular slots; a plurality of conductive rods inserted into the slots; and short-circuit rings disposed at both ends of the conductive rods, wherein the conductive rods are made of copper, and a ratio of a product of the number N2 of the conductive rods and the diameter d2 of each conductive rod to the outer diameter D of the rotor is in a range of 1.1 to 1.5; namely, $$1.1 \leq N2 \cdot d2/D \leq 1.5.$$

This optimized range, defined by upper and lower limits of the ratio N2·d2/D, is determined as follows. The upper limit of the ratio N2√d2/D is defined as a value where a stress imparted on the iron core of the rotor is equal to an allowance stress of iron core material. The lower limit of the ratio N2·d2/D is defined as a critical point where a secondary copper loss of the conductive rods increases. Furthermore, the lower limit of the ratio N2·d2/D is defined as a critical point where a slip factor of the motor increases.

In accordance with the present invention, setting of the ratio N2·d2/D being not larger than 1.5 is effective to suppress the circumferential stress acting on the iron core of the rotor within its allowance stress, thereby preventing deformation or damage of the rotor. On the other hand, setting of the ratio N2·d2/D being not smaller than 1.1 is effective to suppress the secondary copper loss, thereby providing a high-frequency motor having an excellent motor efficiency.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

Figure 3:
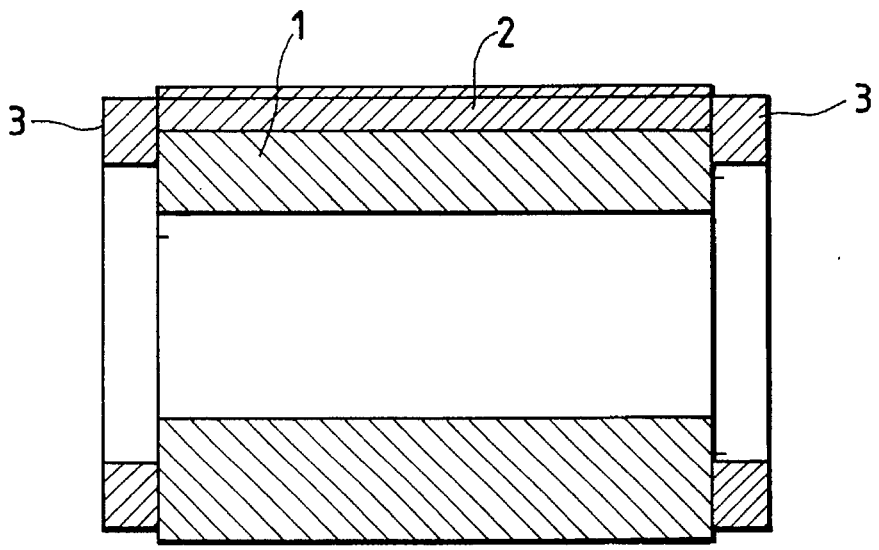
FIG. 3 is a vertical cross-sectional view schematically showing a squirrel-cage rotor in accordance with the present invention.
Figure 4:
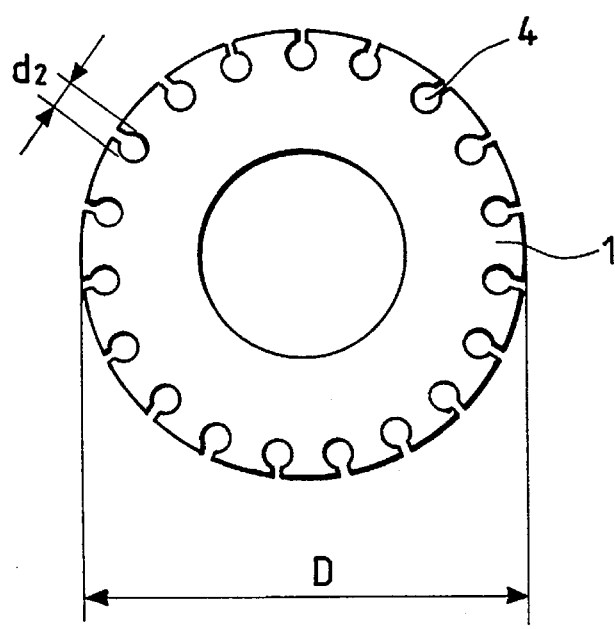
FIG. 4 is a side view showing an iron core plate of the squirrel-cage rotor in accordance with the present invention.

A preferred embodiment of the present invention will be explained in greater detail hereinafter, with reference to the accompanying drawings. FIG. 3 is a vertical cross-sectional view schematically showing an embodiment of a squirrel-cage rotor, and FIG. 4 is a side view showing an iron core plate of the squirrel-cage rotor of FIG. 3. In FIGS. 3 and 4, an iron core 1, of a column shape having an outer diameter of D, comprises a plurality of circular slots 4—4 extending in an axial direction thereof and disposed along the circumferential peripheral edge at regular intervals. Each circular slot 4 is coupled with a conductive rod 2 having a diameter of d2. That is, there are provided a plurality of conductive rods 2—2 as many as the circular slots 4—4, each conductive rod 2 having a thin column shape just fitting to and inserted into corresponding circular slot 4. A circular short-circuit ring 3 is disposed at each of both ends of the iron core 1 so that both ends of each conductive rod 2 is sandwiched between pair of short circuit rings 3 and 3.

Figure 1:
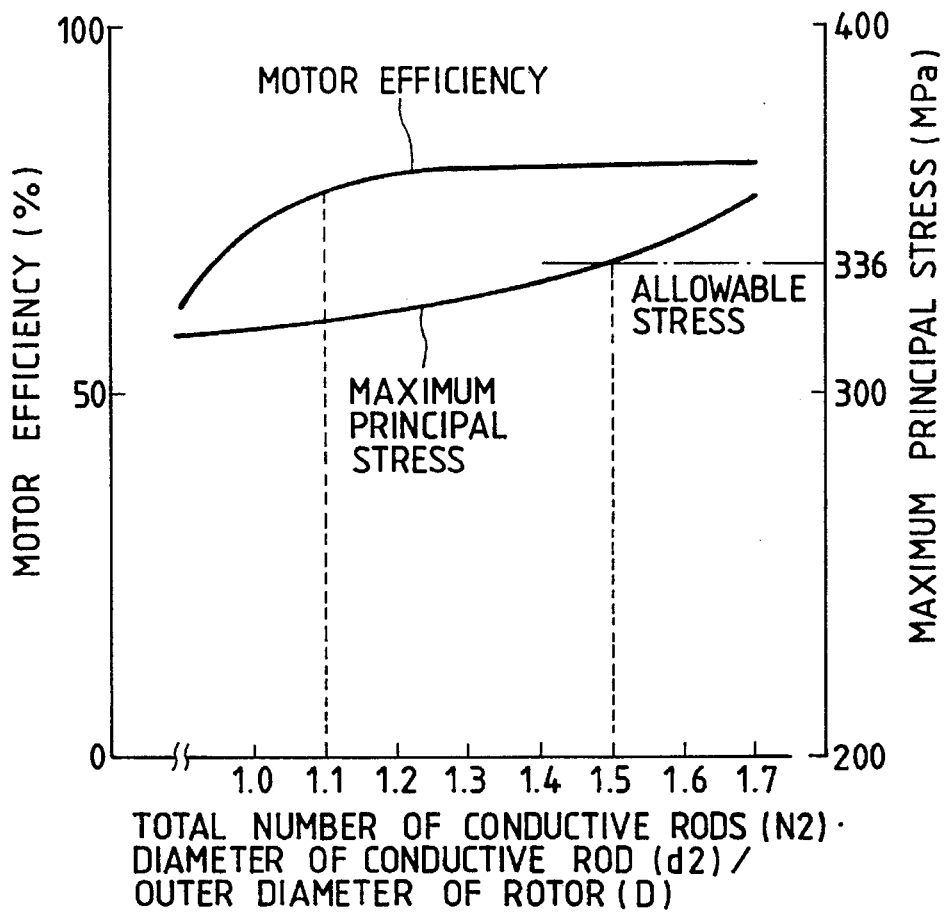
FIG. 1 is a graph showing the motor efficiency and the maximum principal stress of a rotor iron core in relation to the ratio of a product of the number of conductive rods and the diameter of each conductive rod to the outer diameter of the rotor, in accordance with the present invention.

FIG. 1 is a graph showing the maximum principal stress of a rotor iron core and the motor efficiency in relation to the ratio (N2·d2/D) of a product of the number N2 of the conductive rods and the diameter d2 of each conductive rod to the outer diameter D of the rotor, when the conductive rods are made of copper in accordance with the present invention. Data shown in FIG. 1 are obtained in an operation of a motor having a rotor outer diameter 20 mm at a rotational speed of 150,000 min$^{-1}$. Regarding the allowance stress of silicon steel chiefly used for various electrical machineries and devices, a practical value for a typical example 50A290 is 336 MPa. It means that, when such material is used for the iron core of the rotor, the maximum stress acting on the iron core must be less than 336 MPa in order to prevent the iron core from being deformed. Deformation of the iron core may induce a collision between the iron core and a stator, which will possibly cause cracks on the iron core or result in damage of the motor.

The stress acting on the iron core of the rotor increases as the total number N2 of the conductive rods 2 or the diameter d2 of each conductor rod 2 increases with respect to the outer size D of the rotor. Therefore, it is necessary to determine the upper limit of the ratio (N2·d2/D) in such a manner that the stress imparted on the iron core of the rotor does not exceed the allowance stress of the iron core material. As understood from FIG. 1, when the ratio (N2·d2/D) is not larger than 1.5, it is assured that the rotor is not damaged. However, the secondary resistance of the conductive rod is proportional to the square of the total number of the conductive rods N2 and the diameter d2 of each conductive rod. Therefore, the secondary copper loss will increase when the ratio (N2·d2/D) is excessively small. In fact, as shown in FIG. 1, the motor efficiency shows a sudden drop if the ratio (N2·d2/D) decreases less than 1.1.

Figure 2:
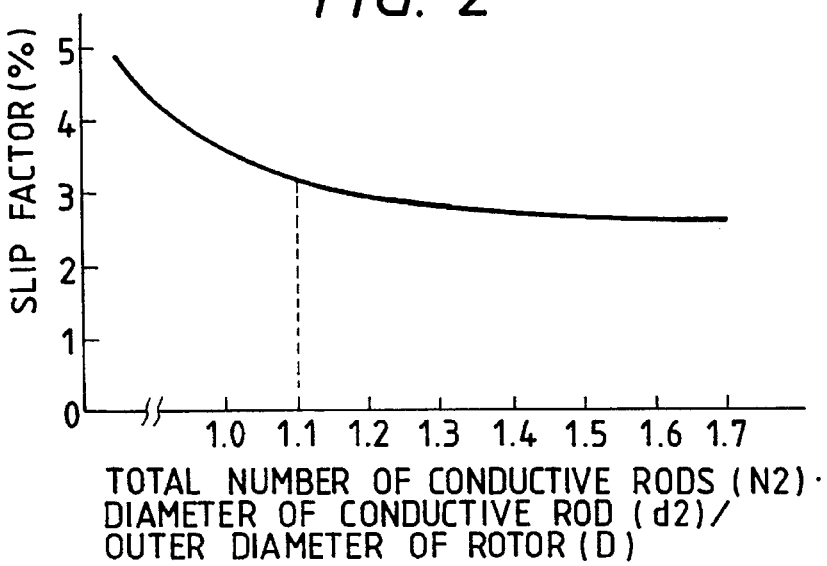
FIG. 2 is a graph showing a relation between the slip factor and the ratio of the product of the number of conductive rods and the diameter of each conductive rod to the outer diameter of the rotor, when the motor generates a required torque in accordance with the present invention.

FIG. 2 is a graph showing a relation between the slip factor and (N2·d2/D) when the motor generates a required torque. Data of FIG. 2 are obtained in the motor having a rotor of an outer diameter 20 mm. From the principle of rotation of the high-frequency motor, the rotor is rotated in accordance with the rotating magnetic field generated by the stator. Hence, there is inherently caused a significant amount of slip between the rotating magnetic field of the stator and the rotor. A ratio of the frequency of rotational difference to the frequency of the rotating magnetic field is referred to as a slip factor. The larger the slip factor, the lower the rotational speed of the rotor. As known from FIG. 2, when the motor generates a required torque, the slip factor increases in the region where the ratio (N2·d2/D) is less than 1.1. It means that the intended maximum rotational speed cannot be obtained in this region, thus, it is necessary to set the ratio (N2·d2/D) to be not smaller than 1.1.

As apparent from the foregoing description, the high-frequency motor of the present invention employs the conductive rods made of copper, and a ratio (N2·d2/D) of a product of the number N2 of the conductive rods and the diameter d2 of each conductive rod to the outer diameter D of the rotor is in a range of 1.1 to 1.5. Thus, it becomes possible to provide a high-frequency motor having a squirrel-cage rotor having a set of conductive rods and a rotor which are both optimized in size and number, so that it becomes possible to achieve a maximum rotational speed of more than 120,000 min$^{-1}$ and obtain an excellent motor efficiency.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A high-frequency motor comprising a squirrel-cage rotor, said rotor comprising:

an iron core having a plurality of circular slots;

a plurality of conductive rods inserted into said slots; and short-circuit rings disposed at both ends of said conductive rods, wherein said conductive rods are made of copper, and a ratio of a product of the number of said conductive rods, and a diameter of each conductive rod to an outer diameter of said rotor is in a range of 1.1 to 1.5 for providing an optimum efficiency without exceeding a safe mechanical stress.

2. A high-frequency motor comprising a squirrel-cage rotor, said rotor comprising:

an iron core having a plurality of circular slots;

a plurality of conductive rods inserted into said slots; and short-circuit rings disposed at both ends of said conductive rods, wherein said conductive rods are made of copper, and a ratio of a product of the number of said conductive rods, and a diameter of each conductive rod to an outer diameter of said rotor is in a predetermined optimized range for optimum efficiency without exceeding a safe mechanical stress during rotation of said rotor.

3. The high-frequency motor defined by claim 2, wherein said optimized range is defined by upper and lower limits of said ratio.

4. The high-frequency motor defined by claim 3, wherein said upper limit of the ratio is defined as a value where a stress imparted on the iron core of the rotor is equal to an allowance stress of iron core material.

5. The high-frequency motor defined by claim 3, wherein said lower limit of the ratio is defined as a critical point where a secondary copper loss of said conductive rods increases.

6. The high-frequency motor defined by claim 3, wherein said lower limit of the ratio is defined as a critical point where a slip factor of the motor increases.

* * * * *